Patented Dec. 15, 1936

2,064,254

UNITED STATES PATENT OFFICE 2,064,254

PRODUCTION OF HIGHER KETONES

Otto Fuchs, Frankfort-on-the-Main, Erich Naujoks, Berlin-Zehlendorf Mitte, and Wilhelm Querfurth, Mainz-Mombach, Germany No Drawing. Application April 6, 1935, Serial No. 15,134. In Germany August 19, 1931

15 Claims. (Cl. 260—134)

This application is a continuation in part of our application Serial No. 628,273, filed August 10th, 1932. This invention relates to the production of higher ketones. Higher ketones are ketones which have a higher number of carbon atoms than those ketones (lower ketones) which, according to the present invention are reacted with alcohols having an aliphatic character such as aliphatic alcohols or alicyclic alcohols. The ketones involved have an aliphatic character such as aliphatic or alicyclic ketones.

We have found that, starting from low ketones, e. g. acetone, methyl ethyl ketone, etc., higher ketones are readily produced by effecting a direct alkylation of such low ketones by the action of aliphatic alcohols in the presence of catalysts. In the present process alkyl groups are introduced directly, that is, without the use of an oxygen atom into the molecule of the ketone. The newly introduced alkyl groups are those combined with the ketone molecule through a direct carbon to carbon (C—C—) linkage. Such ketones produced by the C—C alkylization are briefly called "higher ketones" in the present application, and such term is to be so understood also in the claims hereinafter. The conversions proceed in a clear manner and with satisfactory yields in the sense of the following equations for example:

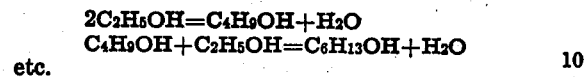

etc.

Elevated temperatures—e. g. 150° C. to 400° C.—and the presence of catalysts are necessary for carrying out the reaction. The following catalysts, for example, have proved to be useful: magnesia or aluminium oxide in a sufficiently active form as principal constituents, to which are added certain quantities of catalytically active metals—e. g. copper or both copper and silver—or of metallic oxides or carbonates of known catalytic activity—for example, barium oxide or molybdenum trioxide or both.

The reaction may be carried out by continuously passing the vapors of the ketone and the aliphatic alcohol in the gaseous phase under ordinary or increased pressure over the catalyst, but it is also possible, particularly when working under increased pressure, to carry out the reaction discontinuously in closed autoclaves, advantageously with the employment of stirring devices which provide for a continued good distribution of the catalyst. When working by passing the vapors over the catalysts, it may be advantageous to employ diluent gases such as hydrogen or nitrogen which, inter alia, facilitate the desorption of the formed higher ketones from the catalyst.

According to the nature of the catalyst and to the temperature, other conversions can occur to a certain extent—e. g. the formation of higher alcohols from ethyl alcohol—in accordance with the following equations

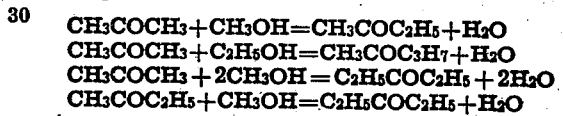

etc.

In a similar manner, by the action of hydrogen upon the ketones, the corresponding secondary alcohol can be produced in small quantities—for example, isopropyl alcohol from acetone. Further, such ketones as are produced by condensation of ketones with branched chains may be formed—e. g. methyl isobutyl ketone from acetone through mesityl oxide. Nevertheless, by choosing the experimental conditions, it is possible to force such secondary reactions, if they are not desired, entirely into the background. In certain circumstances it may be useful to take advantage of secondary reactions and to employ the resulting mixtures as such—e. g. as solvents —or to subject them to a working up which involves no difficulty, because we have here a mixture of chemically well defined substances. It is, inter alia, easily possible to separate the alcohols from the ketones by esterification for example. Also, mixtures of ketones with the esterification products of the alcohols for example, acetic acid esters, constitute extremely valuable solvents.

To the extent to which the initial products, namely, ketone and aliphatic alcohol, come out of the reaction unchanged, they may be separated, for example by distillation, and again subjected to conversion.

The mixed catalysts involved in the present process are those whose one component has a dehydrogenizing action (splitting off H) and the other a dehydrating action (splitting off $H_2O$). The first group, namely the hydrogenizing type, comprises as is known, copper, zinc, zinc oxide, cadmium, tin oxide, vanadium oxide, bismuth, chromium oxide, molybdenum oxide, uranium oxide, managanese oxide, iron, nickel, platinum, etc. and/or their carbonates, formates, etc. The catalyst components of the dehydrating type with the water splitting action comprise, as is known, the earth alkali metals, earth metals, rare earths, silica, titanium, thorium, etc., and/or their oxides, hydroxides, carbonates or the like, and also the acids such as sulphuric acid, phosphoric acid, boric acid, arsenious acid and others. The catalysts used according to the invention are mixed catalysts and contain at least one representative from each of these two groups, namely the dehydrogenizing group and the dehydrating group.

The above mentioned catalysts may be replaced by other mixed catalysts with equal success. The mixed catalysts in question consist advantageously of a component which primarily has a water-splitting (dehydrating) action, and of components which have hydrogenating properties. Water-splitting components comprise: magnesium, aluminum, beryllium, boron, titanium, zirconium, cerium, thorium, oxides, hydroxides, carbonates or salts (nitrates, acetates) thereof. The magnesium may be replaced by calcium, barium or zinc or oxygen-containing compounds thereof, such as carbonates, hydroxides, etc. This group also comprises carbon, e. g. wood charcoal, active carbon, coke, and also silicic acid, preferably in the form of silica gel. The aforementioned substances or their compounds may be used severally or in admixture with each other.

The hydrogenating catalyst components comprise: copper, manganese, silver, chromium, nickel, tungsten, cobalt, iron, cadmium, uranium, thorium, lead, tin and zinc. These substances may be used as metals or in the form of their oxides, hydroxides, carbonates, acetates, nitrates, or in the form of other salts, and also as complex salts. These substances or their compounds may be used severally or in admixture with each other. The reaction may be carried out at ordinary as well as at elevated pressure (e. g. 30–100 atm.).

*Example 1.*—The catalyst is produced by impregnating active alumina with 15 per cent of copper formate and 1.8 per cent of molybdenum trioxide and then treating the impregnated alumina with a mixture of air and steam at 450° C. Methyl alcohol and acetone in equimolecular quantities at 230° C. with the employment of nitrogen as a diluting gas, are passed over the catalyst. The water amounting to 20.6 per cent is removed from the condensate by drying with potassium carbonate. The working up of the product by fractionation at a barometric pressure of 730 mms. gives the following result:

| | Per cent |
|---|---|
| Up to 60° C | 17.4 |
| From 60 to 70° C | 9.3 |
| From 70 to 80° C | 27.9 |
| From 80 to 105° C | 4.1 |
| From 105 to 120° C | 5.0 |
| Above 120° C | 15.1 |
| Water (removed by preliminary drying as above stated) | 20.6 |
| | 99.4 |

The analysis of the individual fractions gives the following composition calculated on 100 atoms of carbon in the initial material as basis:

| | Per cent |
|---|---|
| Methyl alcohol—unchanged | 20.5 |
| Acetone—unchanged | 22.5 |
| Isopropyl alcohol | 1.2 |
| Methyl ethyl ketone | 22.2 |
| Diethyl ketone | 4.5 |
| Polysubstituted high boiling point ketones | 11.9 |
| Carbon in waste gas | 4.5 |
| Deficiency (losses and products not found by analysis) | 12.9 |
| | 100.0 |

If the molybdenum trioxide is replaced by the equivalent quantity of barium oxide, the conversion is improved and only 28 per cent of the carbon is left in the form of unchanged initial substances. The quantity of polysubstituted high boiling point ketones is correspondingly increased.

*Example 2.*—Technical magnesium oxide is thoroughly kneaded with an aluminium hydroxide jelly, copper oxide and silver oxide in such quantities that the composition calculated on percentages of metal is $$Mg:Al:Cu:Ag=89:8:2:1$$

A quantity of acetone and 94 per cent ethyl alcohol in equal weights is passed together with hydrogen at 200° C. over the catalyst which has been dried and pretreated with a mixture of air and steam. Calculated on 100 parts of carbon in the initial material as basis, 18 parts are recovered as acetone and 31 parts as ethyl alcohol, while 18 parts are obtained as methyl propyl ketone, over 4 parts as dipropyl ketone and a further 4 parts as ketones having a still higher boiling point. In addition, butyl and hexyl alcohol (together about 10 per cent) and some ethyl acetate (2 per cent) are produced in smaller quantities as secondary products.

If, instead of the above mentioned catalyst, activated alumina that is impregnated with copper formate (5 per cent of metallic copper) is employed, and the operation is carried out at 260° C., very similar results are obtained. A part of the unused ethyl alcohol occurs in the form of acetaldehyde which can again be used as such as initial material for the reaction, since it replaces the ethyl alcohol in equivalent quantity.

*Example 3.*—Commercial magnesium oxide is worked up with aluminium hydroxide and copper oxide in such quantities that the ratio of the percentages of metal is $Mg:Al:Cu=89:8:3$. The catalyst, which is dried and comminuted to the size of peas, is treated in an iron contact tube with air and steam at 400° to 500° C. and thereupon a mixture of 3.0 mols of acetone, 2.5 mols of ethyl alcohol and 3.2 mols of hydrogen is passed over the catalyst under a pressure of 30 atmospheres and at a temperature of 231° C. The ethyl alcohol used is of a strength of 94 per cent by weight. The boiling-point analysis of the combined and dried products of the reaction at a pressure of 730 mms. of mercury gives the following result:—

| | Gms. |
|---|---|
| Up to 50° C | 68 |
| 50 to 65° C | 421 |
| 65 to 85° C | 862 |
| 85 to 105° C | 248 |
| 105 to 130° C | 178 |
| 130 to 170° C | 181 |
| 170 to 200° C | 120 |
| Above 200° C | 85 |

The result of the working up is that, calculated on percentages of carbon, the product of the reaction contains 62 per cent in the form of unused ethyl alcohol and acetone, 5 per cent of the fraction to be reckoned as ethyl alcohol being present as aldehyde. Further, 18 per cent of the carbon is present as methyl propyl ketone and 9 per cent as dipropyl ketone. Higher alcohols can be isolated in smaller quantities—i. e. 5 per cent of the carbon as butyl alcohol, 7 per cent as hexyl alcohol and higher alcohols. The mixture of acetaldehyde, acetone and ethyl alcohol can again be supplied to the reaction.

In the catalysts used, the copper fraction may be replaced by other hydrogenating metals or metallic compounds, e. g. zinc or vanadium oxide or nickel; similarly, the magnesium fraction may be replaced by barium or calcium or silica gel, etc. There is no quantitative or qualitative difference in the yield.

*Example 4.*—A mixture of 2.5 mols of acetone, 2.0 mols of butyl alcohol and 3.0 mols of hydrogen is passed, under a pressure of 30 atmospheres and at a temperature of 354° C., over the catalyst employed in Example 3. The boiling point analysis at a pressure of 730 mms. of mercury gives

|  | Gms. |
|---|---|
| 50 to 65° C | 536 |
| 65 to 90° C | 210 |
| 90 to 130° C | 273 |
| 130 to 170° C | 1034 |
| 170 to 200° C | 107 |
| Above 200° C | 665 |

The main quantities of the individual fractions pass over within a few degrees, the principal product of the reaction—namely, methyl amyl ketone—for example, passing over at 150° C. By further working up and analysis of the individual fractions, the following result is obtained for every 100 parts of carbon in the mixture:—

|  | Parts |
|---|---|
| As unchanged acetone | 15.0 |
| As isopropyl alcohol | 4.9 |
| As unchanged butyl alcohol | 6.2 |
| As methyl amyl ketone | 29.0 |
| As heptyl alcohol (mainly probably heptanol-2) | 4.7 |
| As octyl alcohol | 2.6 |
| As higher ketones and alcohols, the main quantity being diamyl ketone | 23.1 |

The remaining 14.5 parts are attributed to losses in the reaction and in the working up, and to products not found in the anaylsis.

If somewhat lower reaction temperatures—e. g. 319° C.—are employed, the conversion into the higher boiling point products is smaller and for example, methyl amyl ketone as the preferred reaction product is obtained in an amount higher than 60 per cent of the fractions boil above the boiling point of the butyl alcohol.

*Example 5.*—A mixture of 2 mols of methyl ethyl ketone, 3 mols of ethyl alcohol and 3 mols of hydrogen is passed, under a pressure of 30 atmospheres and at a temperature of 317° C., over the same catalyst as that employed in Examples 3 and 4. The working up of the reaction products, after separating off the unchanged initial substances including a little acetaldehyde, which was produced from the ethyl alcohol, and some butanol-2, which was produced from the ketone, shows that, of the carbon present 26 per cent is present as $C_5$—ketones, 11 per cent as $C_9$—ketones and 4 per cent as ketones boiling above 200° C. In addition, higher alcohols are produced; 31 per cent of the carbon is found as n-butyl alcohol, 14 per cent as hexyl alcohol and a further 14 per cent as higher alcohols.

If higher reaction temperatures—e. g. 351° C.—are employed, the quantity of ketones boiling above 200° C. is considerably increased. Thus, for example, from 100 parts of carbon, there are obtained about 10 per cent each of $C_5$—ketones and $C_9$—ketones and above 50 per cent as ketones boiling above 200° C. mixed with some higher alcohols.

*Example 6.*—The operation is carried out at 250–300° in reaction tubes made of aluminum or iron. Part of the experiments were carried out at elevated pressure (30 atm.) and part at ordinary pressure. Several tests with acetone and butanol as initial material were carried out in the liquid phase. Use was made of an iron pressure tube of 500 cc. capacity. The catalyst which was used had a grain size of ⅜ mm. and contained Mg 89, Al 8, and Cu 3 mol. % as metal. Rate of movement amounted to 1.3 mols acetone+1.7 mols glycol+3.2 mols $H_2$ per hour and 1 liter contact. Operative pressure was 30 atm. and the operative period was 3×24 hours. When the action of the contact appeared about to slacken, it could be regenerated by treatment with moist air at 500–550° C.

Used: 2558 g. acetone+3715 g. glycol=6273 g. mixture. Obtained:

| °C. | G. |  |
|---|---|---|
| 50 | 7 | acetaldehyde |
| 50– 60 | 884 | acetone fraction |
| 60– 73 | 163 |  |
| 73– 77 | 167 |  |
| 77– 85 | 644 | isopropyl fraction |
| 85–100 | 96 |  |
| 100–120 | 84 |  |
| 120–140 | 83 |  |
| 140– 80°$V_{10}$ | 205 | acetylpropyl alcohol fraction |
| 80–105°$V_{10}$ | 92 |  |
|  | 767 | residue |
|  | 3194 |  |

According to the reaction, there results, upon elimination of 1 mol. of water, acetylpropyl alcohol with a B. P. at 729 mm. approx. 280° (dec.)

$$CH_3 \cdot CO \cdot CH_3 + HOCH_2 \cdot CH_2OH \rightarrow CH_3 \cdot CO \cdot CH_2 \cdot CH_2 \cdot CH_2OH + H_2O$$

Upon elimination of two mols of water, diacetylbutane forms with 2 mols of acetone, B. P. 114°.

*Example 7.*—Use was made of a pressure tube. The contact consisted of Mg 89, Al 8, Cu 3. The rate of passage was 2.5 mols acetone+1.5 mols hexanol=3 mols $H_2$ per hour and liter contact. The operative pressure was 30 atm. and the operative period was 6×24 hours. Here also, as in Example 6, the catalyst may be regenerated.

Used: 10300 g. acetone+10640 g. hexanol= 20940 g. mixture. Obtained:

| °C. | G. |  |
|---|---|---|
| Up to 50 | 200 | acetaldehyde |
| 50– 65 | 2051 | acetone fraction (wash column) |
| 65– 85 | 566 | isopropyl fraction |
| 85– 95 | 2136 | isopropyl fraction |

*Aceotropically dehydrated*

| $V_{20}$ | 50– 86 | 2994 | hexyl fraction |
| $V_{20}$ | 86–135 | 2070 | methylheptylketone fraction |
| $V_{20}$ | 135–180 | 1150 | diheptylketone fraction |
| $V_{20}$ | 180–205 | 1136 |  |
| $V_{20}$ | 205–240 | 1021 |  |
|  |  | 1860 | residue |
|  |  | 15184 |  |

Reaction product obtained: 72.5% of the mixture used. 2,286 g. of diheptyl fraction were obtained containing about 35% diheptylketone. The 2700 g. of methylheptylketone fraction contained 47% of methylheptylketone. The B. P. of methylheptylketone at ordinary pressure is 194°–196°. At 24 mm., it is about 100°. Diheptylketone boils at 178° at 20 mm.

*Example 8.*—Use was made of a pressure tube. The contact consisted of Mg 89, Al 8 and Cu 3. The rate of passage was 2 mols butanol+2.5 mols acetone+3 mols $H_2$ per hour and liter contact. The operative period amounted to 24 hours and subsequent oxidation. The temperature was 350°. In mol. % C of the used mixture:

| Acetone | 15.0 |
|---|---|
| Isopropyl | 4.9 |
| Butanol | 6.2 |
| Sec. heptyl | 4.7 |
| Methylamylketone | 29.0 |
| Sec. $C_{11}$—alcohol | 2.6 |
| Diamyl ketone | 23.1 |

The methylamylketone was obtained with a purity of 90%. In the case of diamyl ketone, a 95% product was obtained. The purity of the diamyl ketone was enhanced by freezing out. Diamyl ketone can be fairly well hydrogenated under pressure with nickel-kieselguhr. Under the same conditions, methylamylketone is also readily hydrogenated, resulting in a 99.8% carbinol, which distills well. Methylamylketone B. P. 740 152°, carbinol B. P. 157°. Diamylketone B. P. 740 227°, carbinol B. P. 8 104°.

An operative test was carried out with the same contact for an operative period of 3×48 hours at 30 atm. in the iron tube. The above outlined test was confirmed in the 10 liter capacity reaction tube, thus assuring that the present process can also be carried out on a large scale.

Further tests in the liquid phase with the same contact also confirmed this possibility.

*Example 9.*—This test was carried out at about 260° at ordinary temperature in the aluminum tube at 24 hour intervals, with interposed oxidation, the rate of flow being 0.5 mol. ethanol+0.4 mol. acetone+1.5 mols $H_2$ per hour and liter contact. Obtained, in mol. % C of the used mixture: approx. 15% methylpropyl ketone and 5% dipropyl ketone. The contact consisted of Mg 89, Al 8, Cu 2, Ag 1.

Under the same conditions, with the contact Al (Cu 5)—with active alumina impregnated with copper formate—there were obtained 15% methylpropyl ketone and only 2% dipropyl, calculated as mol. % C of the used mixture.

Under the same conditions, the contact Al (Cu 9 Ba 1) in the aluminum or iron tube, produced approx. 13% methylpropyl ketone and approx. 2% dipropyl ketone.

An operative test at high pressure at about 300° and 30 atm. in the 10 liter iron tube and at a rate of passage of 3 mols ethanol+2.4 mols acetone+3 mols $H_2$ per hour and liter contact gave the following:

Used: 233 kg. acetone+212 kg. ethanol=445 kg. mixture.

Obtained:

| | Kilogram |
|---|---|
| Acetyldehyde | 9.6 |
| Acetone | 72.9 |
| Ethanol+isopropyl | 144.4 |
| Recovery=51% of the used mixture | 226.9 |

Converted=218 kg. mixture.

| | Kilogram |
|---|---|
| Methylpropyl ketone (B. P. 102°), contained for the most part in the recovered spirit | 27.7 |
| Methylpropyl carbinol (B. P. 119°) in fraction 110–130° | 23.6 |
| Dipropyl ketone (B. P. 144°) in fraction 130–160° | 16.2 |
| Dipropyl carbinol (B. P. 153°) in fraction 160–$V_{10}$ 75° | 14.6 |
| Residue | 30.9 |
| | 113.0 |

The contact used in this test contained Mg 89, Al 8, Cu 3.

*Example 10.*—The rate of passage was 1 mol. admixture in the proportion 1:1 per liter contact and hour, nitrogen being used as a diluent. The contact was Al (Cu 9 Mo 1); the temperature was 230° at ordinary pressure. Obtained: 22% methylethyl ketone and 16.4% diethyl ketone+isobutyl-methyl ketone. The aluminum in the catalyst constituted 90 to 95% thereof.

Another contact Al (Cu 9 Ba 1), at a double rate of speed, i. e. 2 mols per hour and liter contact, gave 18.5% methylethyl ketone and 2.3 2% higher ketones. The aluminum in the catalyst constituted 90 to 95% thereof.

*Example 11.*—The test was carried out with about 2 mols acetone+2 mols butanol+3 mols hydrogen per hour and liter contact at 320° and 30 atm. The admixture was passed over the contact in a stationary, electrically heated tube of 0.5 liter capacity. The grain size of the contact was 5–8 mm.

Al (Cu 4½, Be ½)—active aluminum oxide impregnated with a solution of copper formate and beryllium acetate. The aluminum present constituted 90 to 95% of the catalyst.

Used: 32.34 mols C in 4 hours
Recovered: 11.64 mols C (acetone, isopropyl, butanol)
Converted: 20.70 mols C—63.8% of the used C.
Obtained:

| | Used C | (%d. Th) converted C |
|---|---|---|
| | Percent | Percent |
| $C_7$—ketone | 15.8 | 24.6 |
| $C_{11}$—ketone | 6.0 | 9.3 |
| Sec. $C_7$—alcohol | 5.3 | 8.3 |
| Sec. $C_{11}$—alcohol | 3.0 | 4.7 |
| $C_8$—ester | 8.9 | 13.9 |
| $C_{11}$—ester | 3.5 | 5.5 |
| Gases | 2.6 | 4.0 |
| Recovered | 45.1 | 70.3 |
| Total | 36.2 | |
| Hydrocarbons and losses | 81.3 | |
| | 18.7 | |

*Example 12.*—This test was carried out under the same conditions as Test 11.
Mg88Al6½Cu5Fe½(C5P20)—a contact obtained by admixing the commercial oxides or sawdust and phosphoric acid—
Used: 29.40 mols C in 4 hours
Recovered: 12.40 mols C (acetone, isopropyl, butanol)
Converted: 17.0 mols C=57.8% of the used C.

| | Used C | (% d. Th) converted C |
|---|---|---|
| | Percent | Percent |
| $C_7$ ketone | 14.1 | 27.8 |
| $C_{11}$ ketone | 6.1 | 0.5 |
| Sec. $C_7$ alcohol | 7.3 | 12.6 |
| Sec. $C_{11}$ alcohol | 0 | 0 |
| $C_8$ ester | 5.6 | 9.6 |
| $C_{11}$ ester | 1.4 | 2.4 |
| Gases | 0.4 | 0.9 |
| Recovered | 37.0 | 63.8 |
| | 42.2 | |
| Total | 79.2 | |
| Hydrocarbons and losses | 20.8 | |

It is desired to point out that the above mentioned catalysts in the various examples may be replaced by other mixed catalysts with equal success. As was pointed out above, the mixed catalysts consist advantageously of a component which has a dehydrating action and a component which has a hydrogenating property. Such catalysts have been set forth in detail previously.

The present process relates to the treatment of ketones, on the one hand, with aliphatic alcohols, on the other. The ketones involved comprise acetates, methylethyl ketone, diethyl ketone, methylpropyl ketone and the higher homologues, such as diamyl ketone and diheptyl ketone. Alicyclic ketones, such as acetophenol, phenylethyl ketone, may also be reacted in similar manner.

The reaction may be carried out in the vapor phase or in the liquid phase. The operation may also be effected in the presence of diluents, such as nitrogen, carbon dioxide or hydrogen, as well as in the presence of inert liquid diluents (insofar as the reaction is carried out in the liquid phase).

With respect to the proportions between the dehydrating component and the hydrogenating component of the catalyst it is preferable that the dehydrating component be greater than the hydrogenating component.

In the following claims the term "aliphatic" includes both aliphatic and alicyclic ketones and also aliphatic and alicyclic alcohols such for instance as benzyl alcohol or phenylethyl alcohol.

We claim:—

1. The method of producing higher ketones comprising contacting an alcohol having an aliphatic character with a lower ketone in the presence of a mixed catalyst comprising essentially hydrogenating and dehydrating components at a temperature between 150° and 400° C.

2. The method of producing higher ketones comprising contacting an aliphatic alcohol with a lower ketone in the presence of a mixed catalyst comprising essentially hydrogenating and dehydrating components at a temperature between 150° and 400° C.

3. The method of producing higher ketones comprising contacting an aliphatic alcohol with a lower ketone in the vapor phase in the presence of a mixed catalyst comprising essentially hydrogenating and dehydrating components at a temperature between 150° and 400° C.

4. The method of producing higher ketones comprising reacting an aliphatic alcohol with a lower ketone in the vapor phase in the presence of a mixed catalyst comprising essentially hydrogenating and dehydrating components and a diluent inert gas at a temperature between 150° and 400° C.

5. The method of producing higher ketones comprising contacting an aliphatic alcohol with a lower ketone in the vapor phase in the presence of hydrogen and a mixed catalyst comprising essentially hydrogenating and dehydrating components at a temperature between 150° and 400° C.

6. The method of producing higher ketones comprising reacting an aliphatic alcohol with a lower ketone by intimately intermixing the same at a temperature between 150° and 400° C. and under pressure in the liquid phase in the presence of a mixed catalyst comprising essentially hydrogenating and dehydrating components.

7. The method of producing higher ketones comprising reacting an aliphatic alcohol with a lower ketone at a temperature between 150° and 400° C. in the presence of a mixed catalyst comprising essentially hydrogenating and dehydrating components, then separating the higher ketone thus formed from the unchanged portions of the reactants and subjecting the latter to a retreatment.

8. The method of producing higher ketones comprising reacting an aliphatic alcohol with a lower ketone in the presence of a catalyst comprising essentially an alkaline earth metal oxide as the main constituent and a hydrogenating catalyst taken from a group consisting of copper, manganese, silver, chromium, nickel, tungsten, cobalt, iron, cadmium, uranium, thorium, lead, tin, zinc, barium, molybdenum, vanadium, bismuth, platinum and their compounds as a subsidiary constituent at a temperature between 150° and 400° C.

9. The method of producing higher ketones comprising reacting an aliphatic alcohol with a lower ketone in the presence of a catalyst comprising essentially an earth metal oxide as the main constituent and a hydrogenating catalyst taken from a group consisting of copper, manganese, silver, chromium, nickel, tungsten, cobalt, iron, cadmium, uranium, thorium, lead, tin, zinc, barium, molybdenum, vanadium, bismuth, platinum and their compounds as a subsidiary constituent at a temperature between 150° and 400° C.

10. The method of producing higher ketones comprising reacting an aliphatic alcohol with a lower ketone in the presence of a catalyst comprising essentially an alkaline earth metal oxide as the main constituent, an earth metal oxide and a hydrogenating catalyst taken from a group consisting of copper, manganese, silver, chromium, nickel, tungsten, cobalt, iron, cadmium, uranium, thorium, lead, tin, zinc, barium, molybdenum, vanadium, bismuth, platinum and their compounds at a temperature between 150° and 400° C.

11. The method of producing higher ketones comprising reacting a higher aliphatic alcohol with a lower ketone at a temperature between 150 and 400° C. in the presence of a catalyst comprising essentially alumina and magnesium oxide as the main constituents and a small proportion of copper oxide.

12. The method of producing higher ketones comprising reacting an aliphatic alcohol with a lower ketone at a temperature between 150° and 400° C. in the presence of a catalyst comprising essentially alumina and magnesium oxide as the main constituents and a small proportion of silver oxide.

13. The method of producing higher ketones comprising reacting an aliphatic alcohol with a lower ketone in the presence of a catalyst comprising essentially alumina and magnesium oxide as the main constituents and a small proportion of copper and silver oxides at a temperature between 150° and 400° C.

14. The method of producing higher ketones comprising contacting an alcohol having an aliphatic character with a lower ketone in the presence of a mixed catalyst having a dehydrating and hydrogenating effect.

15. The method of producing higher ketones comprising contacting an alcohol having an aliphatic character with a lower ketone in the presence of a mixed catalyst comprising a dehydrating catalyst taken from a group consisting of magnesia, aluminium, beryllium, boron, chromium, titanium, zirconium, cerium, thorium, calcium, barium, silicon, uranium, rare earths and compounds of said metals and a hydrogenating catalyst taken from a group consisting of copper, manganese, silver, chromium, nickel, tungsten, cobalt, iron, cadmium, uranium, thorium, lead, tin, zinc, barium, molybdenum, vanadium, bismuth, platinum and their compounds.

OTTO FUCHS.
ERICH NAUJOKS.
WILHELM QUERFURTH.